(12) United States Patent
Ackermann

(10) Patent No.: US 7,737,292 B2
(45) Date of Patent: Jun. 15, 2010

(54) PROCESS FOR THE PREPARATION OF ORGANOPOLYSILOXANES

(75) Inventor: Hartmut Ackermann, Burghausen (DE)

(73) Assignee: Wacker Chemie AG, Munich (DE)

( * ) Notice: Subject to any disclaimer, the term of this patent is extended or adjusted under 35 U.S.C. 154(b) by 66 days.

(21) Appl. No.: 11/528,026

(22) Filed: Sep. 27, 2006

(65) Prior Publication Data

US 2007/0078277 A1     Apr. 5, 2007

(30) Foreign Application Priority Data

Oct. 4, 2005     (DE) ................. 10 2005 047 394

(51) Int. Cl.
*C07F 7/08*      (2006.01)
(52) U.S. Cl. ................. 556/450; 556/440; 556/455; 568/869; 528/20
(58) Field of Classification Search ................. 568/869; 556/440, 450; 528/20
See application file for complete search history.

(56) References Cited

U.S. PATENT DOCUMENTS

| | | | |
|---|---|---|---|
| 2,398,672 A * | 4/1946 | Sauer .................. | 528/12 |
| 2,470,497 A * | 5/1949 | Lamoreaux ............ | 528/20 |
| 6,069,220 A | 5/2000 | Hoffmann et al. | |
| 6,107,505 A * | 8/2000 | Yoshida et al. ........ | 556/450 |

FOREIGN PATENT DOCUMENTS

| DE | 32 02 558 A1 | 8/1983 |
|---|---|---|
| DE | 228 550 A1 | 10/1985 |
| DE | 198 00 023 A1 | 7/1999 |

OTHER PUBLICATIONS

Loose translation of the abstract belonging to DE 228 550 A1 (front page, point 57).
U.S. 6,069,220 is corresponding to DE 198 00 023 A1.
Patbase Asbstrace corresponding to DE 32 02 558 A1.

* cited by examiner

*Primary Examiner*—Elvis O Price
(74) *Attorney, Agent, or Firm*—Brooks Kushman P.C.

(57) ABSTRACT

A continuous process for the preparation of organopolysiloxanes involves, in a first step, reacting chlorosilanes with from 0.01 to 0.7 mol of water per mole of hydrolyzable chlorine and with from 0.2 to 1.7 mol of alcohol per mole of hydrolyzable chlorine, the molar ratio of water to alcohol being from 0.005 to 3.5; in a second step, the reaction mixture obtained in the first step is optionally mixed continuously with a water-insoluble organic solvent having a density of less than 0.9 kg/l, and water is metered in continuously in amounts of from 0.2 to 100 mol of water per mole of silicon component; and in a third step, the aqueous alcoholic phase is separated off.

20 Claims, No Drawings

PROCESS FOR THE PREPARATION OF ORGANOPOLYSILOXANES

BACKGROUND OF THE INVENTION

1. Field of the Invention

The invention relates to a continuous multistage process for the preparation of organopolysiloxanes by hydrolysis and condensation of chlorosilanes.

2. Background Art

Processes for the continuous preparation of organopolysiloxanes are known. In this context, reference may be made, for example, to DE 198 00 023 A, in which a multistage hydrolysis of full alkoxylate in toluene with hydrochloric acid is described. Furthermore, DE 32 02 558 A describes a continuous process for the preparation of siloxanes with the use of chlorosilanes and dilute hydrochloric acid.

SUMMARY OF THE INVENTION

The present invention relates to a process for the preparation of organopolysiloxanes, in which in a first step, chlorosilanes are reacted continuously with from 0.01 to 0.7 mol of water per mole of hydrolyzable chlorine and with from 0.2 to 1.7 mol of alcohol per mole of hydrolyzable chlorine, the molar ratio of water to alcohol being from 0.005 to 3.5; in a second step, the reaction mixture obtained in the first step is optionally mixed continuously with a water-insoluble organic solvent having a density of less than 0.9 kg/l, and water is metered in continuously in amounts of from 0.2 to 100 mol of water per mole of silicon component; and in a third step, after the reaction of the second step, the aqueous alcoholic phase is separated off.

DETAILED DESCRIPTION OF THE PREFERRED EMBODIMENT(S)

In the context of the present invention, the term organopolysiloxanes is intended to include polymeric, oligomeric and dimeric siloxanes. The chlorosilanes used in the first step of the inventive process are preferably those of the formula

$$R_aSiCl_{4-a} \quad (I),$$

in which each R is identical or different and is a monovalent, SiC-bonded, optionally substituted hydrocarbon radical and a is 0, 1, 2, or 3.

Examples of radicals R are alkyl radicals such as the methyl, ethyl, n-propyl, isopropyl, n-butyl, isobutyl, tert-butyl, n-pentyl, isopentyl, neopentyl or tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals, such as cyclopentyl, cyclohexyl, cycloheptyl, and methylcyclohexyl radicals; aryl radicals such as the phenyl and the naphthyl radical; alkaryl radicals, such as the o-, m-, p-tolyl radicals, xylyl radicals and ethylphenyl radicals; aralkyl radicals, such as the benzyl radical and the α- and the β-phenylethyl radicals.

Examples of substituted radicals R are all radicals which are mentioned above for R, preferably substituted by mercapto groups, epoxy-functional groups, carboxyl groups, keto groups, enamine groups, amino groups, aminoethylamino groups, isocyanato groups, aryloxy groups, acryloyloxy groups, methacryloyloxy groups, hydroxyl groups and halogen groups.

Radical R is preferably a hydrocarbon radical having 1 to 8 carbon atoms, most preferably the methyl, isooctyl and phenyl radicals, in particular, the methyl radical.

Examples of silanes of the formula (I) are methyltrichlorosilane, dimethyldichlorosilane, trimethylchlorosilane, tetrachlorosilane, phenyltrichlorosilane, diphenyldichlorosilane, methylphenyldichlorosilane and isooctyltrichlorosilane.

The silanes used in the process according to the invention are preferably liquid at 20° C. under a pressure of from 900 to 1100 hPa. Mixtures of silanes of the formula (I) with at least one trichlorosilane are preferably used.

In the context of the present invention hydrolyzable chlorine is to be understood as meaning that chlorine which is present is in the form of SiCl groups.

In the first step of the process, chlorosilanes are preferably reacted with from 0.01 to 0.65 mol, more preferably from 0.01 to 0.6 mol of water per mole of hydrolyzable chlorine, and with from 0.35 to 1.5 mol, more preferably from 0.4 to 1.4 mol of alcohol per mole of hydrolyzable chlorine. The molar water-to-alcohol ratio used is preferably from 0.006 to 2.0.

Examples of alcohols which are used in the first step of the process are all alcohols which are liquid at a temperature of 20° C. and a pressure of from 900 to 1100 hPa, such as methanol, ethanol, propanol, butanol, pentanol, hexanol, heptanol, octanol or isomers thereof, methanol, ethanol and butanol being preferred and ethanol being particularly preferred.

If desired, further substances can also be used in addition to chlorosilanes, water, and alcohol in the first step of the inventive process, which, however, is not preferred. Examples of optionally used further substances are water-insoluble organic solvents, such as toluene, or alkoxysilanes, such as tetraethoxysilane.

The first step of the process is preferably carried out at a temperature from 0 to 100° C., in particular from 20 to 70° C., and preferably at a pressure of from 900 to 2000 hPa, more preferably from 1000 to 1500 hPa.

In the first step of the process, silane, water, alcohol and optionally further substances are mixed in any desired manner and allowed to react, hydrogen chloride, alkyl chloride and dialkyl ether being formed. The hydrogen chloride gas obtained in the first step can be used directly in other processes, for example with methanol for the preparation of chloromethane, which in turn is used in the methylchlorosilane synthesis. Thus, the chlorine can be cycled without being released to the environment.

The first step of the process is preferably carried out in a loop reactor, more preferably without the introduction of mechanical energy, i.e. with natural circulation.

In the reaction mixture obtained in the first step, the silicon component substantially comprises chloro-, hydroxy-, and alkoxy-functional silanes, siloxanes, and optionally cyclosiloxanes. Furthermore, the reaction mixture contains water, alcohol, hydrogen chloride and small amounts of alkyl chloride, dialkyl ether and optionally further substances.

In the context of the present invention, density data are based on a temperature of 20° C. and ambient pressure, i.e. from 900 to 1100 hPa. Also, in the context of the present invention, water-insoluble organic solvents are to be understood as meaning those solvents which have a solubility at 25° C. and ambient pressure, i.e. from 900 to 1100 hPa, of less than 1 g of solvent/100 g of water.

Examples of water-insoluble organic solvents optionally used in the process are saturated hydrocarbons such as pentane, hexane, heptane or octane and branched isomers thereof, and mixtures of these saturated hydrocarbons, as well as unsaturated hydrocarbons such as hexene, heptene, octene and 1-decene, ketones such as acetone, methyl ethyl ketone, and methyl isobutyl ketone, and aromatic hydrocarbons such as benzene, toluene and xylenes, preferably toluene.

If water-insoluble organic solvent is used in the second step of the process, the relevant amounts are preferably from 1 to 100 mol, more preferably from 2 to 90 mol, based in each case on one mole of silicon component. Water-insoluble organic solvent is preferably used in the second step.

If desired, further substances may also be used in the second step of the process. Examples of optionally used further substances are chlorosilanes, for example, those of the formula (I), or alkoxysilanes such as tetraalkoxysilane or isooctyltriethoxysilane or alcohols, such as ethanol. If further substances are used in the second stage, the relevant amounts are preferably from 0.01 to 40 parts by weight, based on 100 parts by weight of the silicon component used in the first step.

In the second step of the process according to the invention, the silicon component of the reaction mixture obtained in the first step and optionally used further substances are hydrolyzed and condensed to the desired degree of polymerization by controlled addition of water.

In a preferred embodiment of the process, the reaction mixture obtained in the first step is optionally mixed with toluene in the second step and water is metered in over a defined period, the mixing process being carried out by means of introduction of mechanical energy.

In a particularly preferred embodiment of the process, the second step is carried out in a loop reactor with a devolatilization container integrated in the loop (for example having a total internal volume of 1.6 m³), by metering in the reaction mixture obtained in the first step (e.g. 500 l/h), water (e.g. 100 l/h), optionally toluene (e.g. 685 l/h) and optionally further components (37 kg/h) continuously upstream of the circulation pump in the direction of flow (e.g. at a speed of 1700 rpm). Stirring may, if desired, be effected simultaneously in the devolatilization container.

The second step of the process is preferably carried out at a temperature of from 0 to 100° C., in particular from 20 to 80° C., and preferably at a pressure of from 900 to 2000 hPa, more preferably from 1000 to 1500 hPa. The hydrolysis or condensation reaction taking place in the second step can be stopped by any desired method, such as, for example, dilution with water or neutralization with base, for example with a sodium hydroxide solution.

In the third step of the process, the siloxane phase is separated from the aqueous alcoholic hydrogen chloride phase. This can be effected by methods known to the person skilled in the art, such as, for example, continuously in a horizontal container, the reaction mixture being metered in on one side and it being possible for the upper phase to be removed separately from the lower phase on the other side.

The siloxane phase thus obtained can then be worked up by any desired method known per se, for example, neutralization, filtration or separation of all readily volatile constituents, preferably by distillation. The readily volatile constituents are preferably low molecular weight cyclic siloxanes and the water-insoluble organic solvents having a density of less than 0.9 kg/l. Furthermore, the concentration can be increased, for example, in the siloxane phase, by removing the solvent. This may be accomplished, for example, by distillation in a thin-film evaporator, and organopolysiloxane solutions can thus be prepared or the solvent can be completely removed and solvent-free siloxanes thus obtained.

A multiplicity of organopolysiloxanes having defined properties can be reproducibly prepared by the process according to the invention, such as those which contain SiC-bonded radicals, hydroxyl radicals and/or alkoxy radicals. In particular, the process according to the invention is outstandingly suitable for the preparation of organopolysiloxane resins.

The organopolysiloxanes prepared according to the invention may be solid or liquid at 20° C. and at a pressure of from 900 to 1100 hPa and preferably have an average molecular weight, measured against a polystyrene standard, of from 162 to 100,000 g/mol, most preferably from 200 to 80,000 g/mol.

The organopolysiloxanes prepared are at least partially, but preferably, completely soluble in alkoxy- and/or hydroxysilanes and/or condensates thereof.

The organopolysiloxanes prepared according to the invention are preferably those of the formula

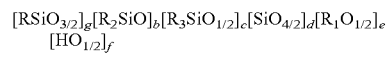

where R is a methyl, isooctyl or phenyl radical, $R^1$ is a methyl, ethyl and butyl radical, g=2-200, b=0-100, c=0-50, d=0-100, e=0-20 and f=0-10.

Examples of organopolysiloxanes prepared according to the invention are $[MeSiO_{3/2}]_{35.1}[Me_2SiO]_{4.2}[EtO_{1/2}]_{3.3}[HO_{1/2}]_{1.5}$, $[MeSiO_{3/2}]_{40.7}[Me_2SiO]_{4.8}[Me_3SiO_{1/2}]_{3.5}[IoSiO_{3/2}]_{5.6}[EtO_{1/2}]_{3.6}[HO_{1/2}]_{0.3}$, $[MeSiO_{3/2}]_{15}[Me_2SiO]_{1.7}[Me_3SiO_{1/2}]_{1.4}[MeO_{1/2}]_{2.8}[BuO_{1/2}]_{0.04}[HO_{1/2}]_{0.27}$ and $[PhSiO_{3/2}]_{7.4}[Me_2SiO]_{1.5}[MeO_{1/2}]_{1.3[BuO1/2]}]_{0.03}[HO_{1/2}]_{0.14}$, Me being a phenyl radical, Et being an ethyl radical, Io an isooctyl radical, Ph being a phenyl radical, and Bu being a butyl radical.

The organopolysiloxanes can be used for all purposes for which organopolysiloxanes are useful, such as, for example, in building protection, in the coating sector, in cosmetic products and in the textile and paper sectors. They are particularly suitable for the preparation of emulsions and as binders for the preparation of paints and finishes.

The inventive process has the advantage that it is simple to carry out and organopolysiloxanes having a high yield can be prepared, and the further advantage that the optionally used water-insoluble organic solvents, hydrogen chloride and alcohol, can be recovered in a simple manner.

With the aid of the process of the invention, organopolysiloxanes are obtained which, owing to the completely continuous procedure, have a very uniform product quality and extremely high storage stability. A further advantage of the process is that it is possible to prepare organopolysiloxanes which have a very low chloride content and a low VOC content. Furthermore, the process according to the invention has the advantage that, owing to the completely continuous procedure, siloxanes can be prepared very economically with an optimum space/time yield. The process permits very effective plant utilization since the cleaning effort which is considerable in the case of many processes of the prior art owing to contamination of the plant parts with gel, is minimal here.

In the following examples, all data on parts and percentages are based on weight, unless stated otherwise. Unless stated otherwise, the following examples are carried out at ambient pressure, i.e. at about 1000 hPa, and at room temperature i.e. about 20° C. or a temperature which is established on combining the reactants at room temperature without additional heating or cooling. All viscosity data mentioned in the examples are intended to be based on a temperature of 25° C.

The average empirical formulae mentioned below derive from the evaluation of $^1$H- and $^{29}$Si-NMR and GPC spectroscopy (measured against a polystyrene standard, taking into account the weight average Mw) of the respective product.

Example 1

1000 kg/h of a chlorosilane mixture comprising 900 kg/h of methyltrichlorosilane and 100 kg/h of dimethyldichlorosilane, and 700 kg/h of a mixture of 638 kg/h of ethanol and 62 kg/h of water are metered continuously into a continuously operated reaction loop having an internal volume of 1.35 m$^3$, of which 0.85 m$^3$ represents devolatilization volume, with a natural circulation. The reaction temperature is 30-35° C., the gage pressure is about 100 to 250 mbar and the average residence time is 20-24 minutes. During the reaction, 350-400 kg/h of hydrogen chloride are liberated, which is fed to the hydrogen chloride recovery plant. For the hydrolysis/condensation, 1340 kg/h of the HCl-concentrated partial alkoxylate obtained in the first reaction loop, 1570 kg/h of toluene and 267 kg/h of water are metered continuously into a second continuously operated reaction loop having an internal volume of 3.5 m$^3$, a devolatilization volume of 0.5 m$^3$ and a circulation pump with a delivery of 60 m$^3$/h, upstream of the centrifugal pump in the direction of flow, an average residence time of 60 minutes for the hydrolysis/condensation reaction mixture, a gage pressure of from 100 to 250 mbar and a reaction temperature of from 47 to 52° C. being established.

1600 kg/h of water are fed continuously into the transport pipe with thorough mixing and added to the 3177 kg/h of the reaction mixture transported from the second reaction loop, in order to reduce the acid concentration to an unreactive level (HCl content in the acid phase, ethanol phase, water phase <14% by weight) so that the phase separation can be carried out without further condensation steps taking place.

Gelled fractions are removed from the mixture by means of a decanter. The gel-free mixture is metered continuously on one side into a horizontal container having an internal volume of 5 m$^3$. On the other side, the upper phase is removed separately from the lower phase.

In further working-up steps, the toluene resin phase thus obtained is concentrated to a higher solids content in a distillation column operated with packings, neutralized with sodium bicarbonate, freed from catalytically active metal traces with active carbon and then filtered over a filter aid and freed from volatile constituents in a thin-film evaporator at a temperature of 120-190° C. and a vacuum of 100 mbar. The toluene obtained in the reaction step comprising concentration and thin-films is used again in the second reaction step (hydrolysis/condensation). The acidic ethanolic/aqueous phase from the third step (phase separation) is made alkaline and then redistilled and is used again in the first reaction step.

An organopolysiloxane having an average formula $[MeSiO_{3/2}]_{35.1}[Me_2SiO]_{4.2}[EtO_{1/2}]_{33}[HO_{1/2}]_{1.5}$ is obtained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the continuous preparation of organopolysiloxanes, comprising:

in a first step, continuously reacting a silane component consisting essentially of one or more chlorosilanes with from 0.01 to 0.7 mol of water per mole of hydrolyzable chlorine and with from 0.2 to 1.7 mol of alcohol per mole of hydrolyzable chlorine, the molar ratio of water to alcohol being from 0.005 to 3.5, in a second step, continuously metering the reaction mixture from the first step into water, in amounts of from 0.2 to 100 mol of water per mole of silicon component, the reaction mixture from the first step mixed with a water-insoluble organic solvent having a density of less than 0.9 kg/l, and in a third step, separating an aqueous alcoholic phase from a phase comprising organopolysiloxane and water-insoluble organic solvent.

2. The process of claim 1, wherein the chlorosilanes have the formula

$$R_aSiCl_{4-a} \quad (I),$$

in which each R independently is a monovalent, SiC-bonded, optionally substituted hydrocarbon radical and a is 0, 1, 2 or 3.

3. The process of claim 1, wherein, in the first step, chlorosilanes are reacted with from 0.01 to 0.65 mol of water per mole of hydrolyzable chlorine.

4. The process of claim 1, wherein, in the first step, chlorosilanes are reacted with from 0.35 to 1.5 mol of alcohol per mole of hydrolyzable chlorine.

5. The process of claim 2, wherein, in the first step, chlorosilanes are reacted with from 0.35 to 1.5 mol of alcohol per mole of hydrolyzable chlorine.

6. The process of claim 3, wherein, in the first step, chlorosilanes are reacted with from 0.35 to 1.5 mol of alcohol per mole of hydrolyzable chlorine.

7. The process of claim 1, wherein, in the first step, the molar water-to-alcohol ratio used is from 0.006 to 2.0.

8. The process of claim 2, wherein, in the first step, the molar water-to-alcohol ratio used is from 0.006 to 2.0.

9. The process of claim 3, wherein, in the first step, the molar water-to-alcohol ratio used is from 0.006 to 2.0.

10. The process of claim 4, wherein, in the first step, the molar water-to-alcohol ratio used is from 0.006 to 2.0.

11. The process of claim 1, wherein an alcohol used in the first step is selected from the group consisting of methanol, ethanol, and butanol.

12. The process of claim 1, wherein, in the second step, a water-insoluble organic solvent is used.

13. The process of claim 1, wherein no alkoxysilane is added in the first step.

14. The process of claim 1, wherein gaseous hydrogen chloride is generated in the first step and is separated and recovered from the first step.

15. A process for the continuous preparation of organopolysiloxanes, comprising:

in a first step, continuously reacting chlorosilanes with from 0.01 to 0.7 mol of water per mole of hydrolyzable chlorine and with from 0.2 to 1.7 mol of alcohol per mole of hydrolyzable chlorine, the molar ratio of water to alcohol being from 0.005 to 3.5, in a second step, continuously metering the reaction mixture from the first step into water, in amounts of from 0.2 to 100 mol of water per mole of silicon component, the reaction mixture from the first step optionally mixed with a water-insoluble organic solvent having a density of less than 0.9 kg/l, and in a third step, separating an aqueous alcoholic phase, wherein gaseous HCl is generated in the first step and is separated from the first step and recovered.

16. The process of claim 15, wherein the first step is conducted in a loop reactor, and the reactant feed to the loop reactor consists essentially of chlorosilane(s), alcohol, and water.

17. The process of claim 15, wherein alcohol is separated from the aqueous alcoholic phase by distillation and is recycled back to the first step.

18. The process of claim 15, wherein no alkoxysilane is introduced into the first step.

19. The process of claim 15, wherein reactants introduced in the first step consist of alcohol, one or more chlorosilanes, and water.

20. The process of claim 15, wherein a water-insoluble organic solvent is present in the second step.

\* \* \* \* \*